No. 614,116. Patented Nov. 15, 1898.
E. A. LOSEE.
HOLDER.
(Application filed Sept. 24, 1897.)
(No Model.)
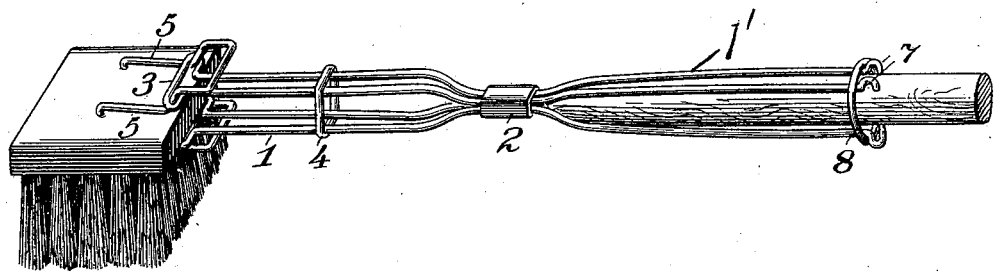
Witnesses.
Inventor.

UNITED STATES PATENT OFFICE.

EZRA A. LOSEE, OF LAKE CITY, IOWA.

HOLDER.

SPECIFICATION forming part of Letters Patent No. 614,116, dated November 15, 1898.

Application filed September 24, 1897. Serial No. 652,942. (No model.)

*To all whom it may concern:*

Be it known that I, EZRA A. LOSEE, a citizen of the United States, residing at Lake City, in the county of Calhoun and State of Iowa, have invented a new and useful Holder, which is an improvement on the device shown in Patent No. 583,576, and of which invention the following is a specification.

This invention relates to improvements in a holder; and the object of the same is to provide a device whereby all kinds of brushes can be attached to said holder for scrubbing, whitewashing, calcimining, painting, and holding pruning-saws, &c.

This invention possesses the advantages of simplicity of construction, efficiency of operation, and cheapness of manufacture, as will appear from the specification and drawings, in which the figure is a perspective view of said holder, showing the detachable wire jaws to attach to brushes, &c., and a section of the handle as held in place by the adjustable socket.

This holder consists in one pair of wire jaws 1, extending from a clamped center 2, said pair of jaws being provided with transverse heads 3, and a sliding ring 4, while the other ends of said jaws extend from said clamped center 2 and terminate in pointed hooks to form the socket 7 and are provided with the sliding ring 8 to hold the handle or pole. The socket 7 consists in pointed hooks being formed on the ends of each wire to engage with the handle or pole and a sliding ring 8 to form an adjustable socket 7.

I do not limit myself to a specific form of center, as Patent No. 583,576 covers an interposed stem or center, but preferably use a clamped center without departing from the spirit of my invention.

The extra wire jaws 5 are made of steel wire and formed so as to be inserted in the transverse heads 3, resting partly above said heads and partly below said heads. The wire must be large enough to fill the opening in said heads crosswise, and have a bend or offset near the center of said detachable wire jaws to hold them rigid endwise. Pointed hooks are formed on the outer ends of said detachable wire jaws to engage with the handles of brushes, &c.—two hooks above and two hooks below the handle to form a detachable holder.

What I claim as my new invention, and desire to secure by Letters Patent, is—

1. A holder of the kind specified, consisting of one pair of wire jaws 1, extending from a clamped center 2, said pair of jaws being provided with transverse heads 3, and a sliding ring 4, and pointed hooks formed on the opposite ends of said jaws extending from the clamped center 2, to form the socket 7, and a sliding ring 8, to form an adjustable socket 7, substantially as described.

2. A holder of the kind specified, consisting of one pair of wire jaws 1, extending from a clamped center 2, said pair of jaws being provided with transverse heads 3, and a sliding ring 4, and pointed hooks formed on the opposite ends of said jaws, extending from the clamped center 2, to form the socket 7, and a sliding ring 8, to form an adjustable socket 7, and having detachable wire jaws 5, wide enough to fill the openings in the transverse heads 3, with bend or offset near the center, of said detachable wire jaws, to hold them rigid endwise, resting partly above said transverse heads 3, and partly below said heads, and pointed hooks formed on the outer ends of said detachable wire jaws 5, to form a detachable holder substantially as described.

EZRA A. LOSEE.

Witnesses:
GEO. B. BROWN,
M. E. HUTCHISON.